US008749806B2

United States Patent

Ono et al.

(10) Patent No.: US 8,749,806 B2

(45) Date of Patent: Jun. 10, 2014

(54) POWER MANAGEMENT FOR IMAGE PROCESSING APPARATUS

(75) Inventors: Masafumi Ono, Kanagawa (JP); Jyunya Yamada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 204 days.

(21) Appl. No.: 13/301,085

(22) Filed: Nov. 21, 2011

(65) Prior Publication Data

US 2012/0300250 A1 Nov. 29, 2012

(30) Foreign Application Priority Data

May 25, 2011 (JP) ................................ 2011-117330

(51) Int. Cl.
*G06K 15/00* (2006.01)

(52) U.S. Cl.
USPC ........ 358/1.14; 358/1.15; 358/1.13; 713/323; 713/324; 399/81

(58) Field of Classification Search
CPC .......... G03G 15/5004; H04N 1/00896; H04N 1/0085; G60F 1/3203; G60F 3/1221; G60F 3/1236
USPC ............ 358/1.13-1.16, 1.1; 399/81; 713/323, 713/324
See application file for complete search history.

(56) References Cited

U.S. PATENT DOCUMENTS 5,423,045 A * 6/1995 Kannan et al. ................ 713/322
6,226,472 B1 * 5/2001 Yun ................................ 399/81
8,634,085 B2 * 1/2014 Isogai et al. ................ 358/1.13
2002/0141776 A1 10/2002 Hirakawa et al.
2007/0165262 A1 * 7/2007 Watanabe et al. ............ 358/1.14
2007/0201076 A1 * 8/2007 Ishida .......................... 358/1.14
2010/0007904 A1 1/2010 Eto
2010/0033751 A1 * 2/2010 Kitamura ..................... 358/1.14
2010/0245910 A1 * 9/2010 Maeda ......................... 358/1.15
2011/0004776 A1 * 1/2011 Tanaka ......................... 713/323
2013/0010330 A1 * 1/2013 Toshihiro ..................... 358/1.15

FOREIGN PATENT DOCUMENTS

JP B2-3134501 2/2001
JP B2-3654638 6/2005
JP B2-3666656 6/2005

OTHER PUBLICATIONS

Sep. 6, 2012 Extended European Search Report issued in European Patent Application No. 11193195.2.

* cited by examiner

*Primary Examiner* — Dennis Dicker
(74) *Attorney, Agent, or Firm* — Oliff PLC

(57) ABSTRACT

An image processing apparatus includes a plurality of functioning units each having a reception functioning unit, a control receiving unit and a controlling unit. Each of the reception functioning unit and the control receiving unit has a high power state and a low power state as an operational state, respectively. In a case that the control receiving unit is in the high power state, the controlling unit transits the operational state of the functioning unit from the high power state to the low power state when a first set time elapses after an execution of a processing is terminated. In another case that the control receiving unit is in the low power state, the controlling unit transits the operational state of the functioning unit from the high power state to the low power state when a second set time elapses after the execution of the processing is terminated.

10 Claims, 6 Drawing Sheets

POWER MANAGEMENT FOR IMAGE PROCESSING APPARATUS

CROSS-REFERENCE TO RELATED APPLICATION

This application is based on and claims priority under 35 USC 119 from Japanese Patent Application No. 2011-117330 filed May 25, 2011.

BACKGROUND

1. Technical Field

The present invention relates to an image processing apparatus and a computer-readable medium.

2. Related Art

There is a technology for reducing power consumption of an electronic device by transiting to a sleep mode right after supplying power in an electronic device.

Also, there is a technology in which a server apparatus collectively and concentratively manages power saving mode transition time information of a plurality of image processing apparatuses that are provided on a network and re-records all at once the power saving mode transition time information of the grouped image processing apparatuses to build up an image processing environment having a high power saving effect by matching power saving environments of each of the image processing apparatuses.

There is a technology of a printer system capable of implementing rapid printing while minimally suppressing overall power consumption.

SUMMARY (1) According to an aspect of the invention, an image processing apparatus includes a plurality of functioning units, a control receiving unit and a controlling unit. Each of the plurality of functioning units includes an image forming functioning unit and a reception functioning unit. The image forming functioning unit is configured to form an image in a medium. The reception functioning unit is configured to receive an execution command of a processing from outside. Each of the plurality of functioning units is configured to have a high power state having high power consumption and a low power state having low power consumption as an operational state. The control receiving unit is configured to receive a user's control and has a high power state and a low power state as an operational state. The controlling unit is configured to separately control at least the operational state of the control receiving unit and the operational state of the functioning unit by transiting between the high power state and the low power state. In a case that the control receiving unit is in the high power state, the controlling unit transits the operational state of the functioning unit which is in the high power state to the low power state when a first set time elapses after an execution of a processing is terminated with respect to at least a predetermined type of the processing. In a case that the control receiving unit is in the low power state, the controlling unit transits the operational state of the functioning unit which is in the high power state to the low power state when a second set time elapses after the execution of the predetermined type of the processing is terminated. The second set time is different from the first set time.

BRIEF DESCRIPTION OF THE DRAWINGS

Exemplary embodiments of the invention will be described in detail based on the following figures, wherein.

DETAILED DESCRIPTION

Hereinafter, embodiments of the present invention will be described in detail with reference to the accompanying drawings.

<Image Processing Apparatus>

Figure 1:
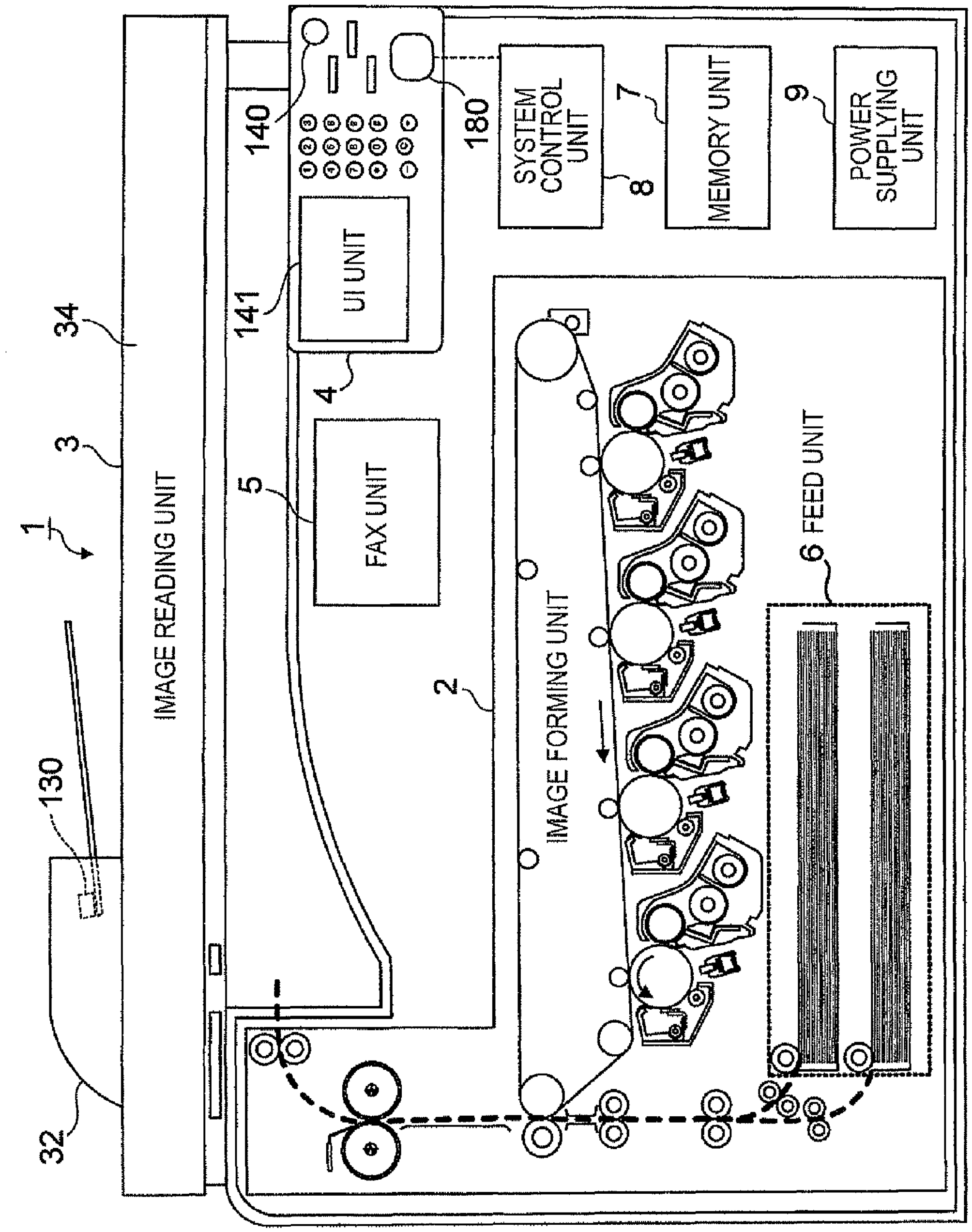
FIG. 1 is a diagram showing an overall configuration example of an image forming apparatus to which the present embodiment is applied.

FIG. 1 is a diagram showing an overall configuration example of an image forming apparatus 1 to which the present embodiment is applied. The image forming apparatus 1 as an example of a body of the apparatus shown in FIG. 1 includes an image forming unit 2 serving as an image forming functioning module that forms an image based on image data (image information) of each color, and an image reading unit 3 that generates image data by reading an image of a document and sending the generated image data to the image forming unit 2. The image forming unit 2 prints accumulated images and the image reading unit 3 performs a reading operation according to a color mode or a resolution designated by a user. The image reading unit 3 includes an automatic document feeder (ADF) 32 and a platen cover 34 covering platen glass.

The image forming apparatus 1 includes a user interface (UI) unit 4 as a control receiving module that includes a liquid crystal display (LCD) panel 141 to receive a control input from the user or display various pieces of information on the user, and a facsimile (FAX) unit 5 transmitting and receiving image information through, for example, a public phone line.

The image forming apparatus 1 includes a feed unit 6 that is installed in a case of the image forming unit 2 or attached to an outer surface of the image forming unit 2 and configured to supply paper to the image forming unit 2, and a memory unit 7 serving as an external storage device. The image forming apparatus 1 also includes a system control unit 8 serving as a controller to control an overall operation of the image forming apparatus 1 or communication through a communication line, and a power supplying unit 9 to supply the power to each unit.

Figure 2:
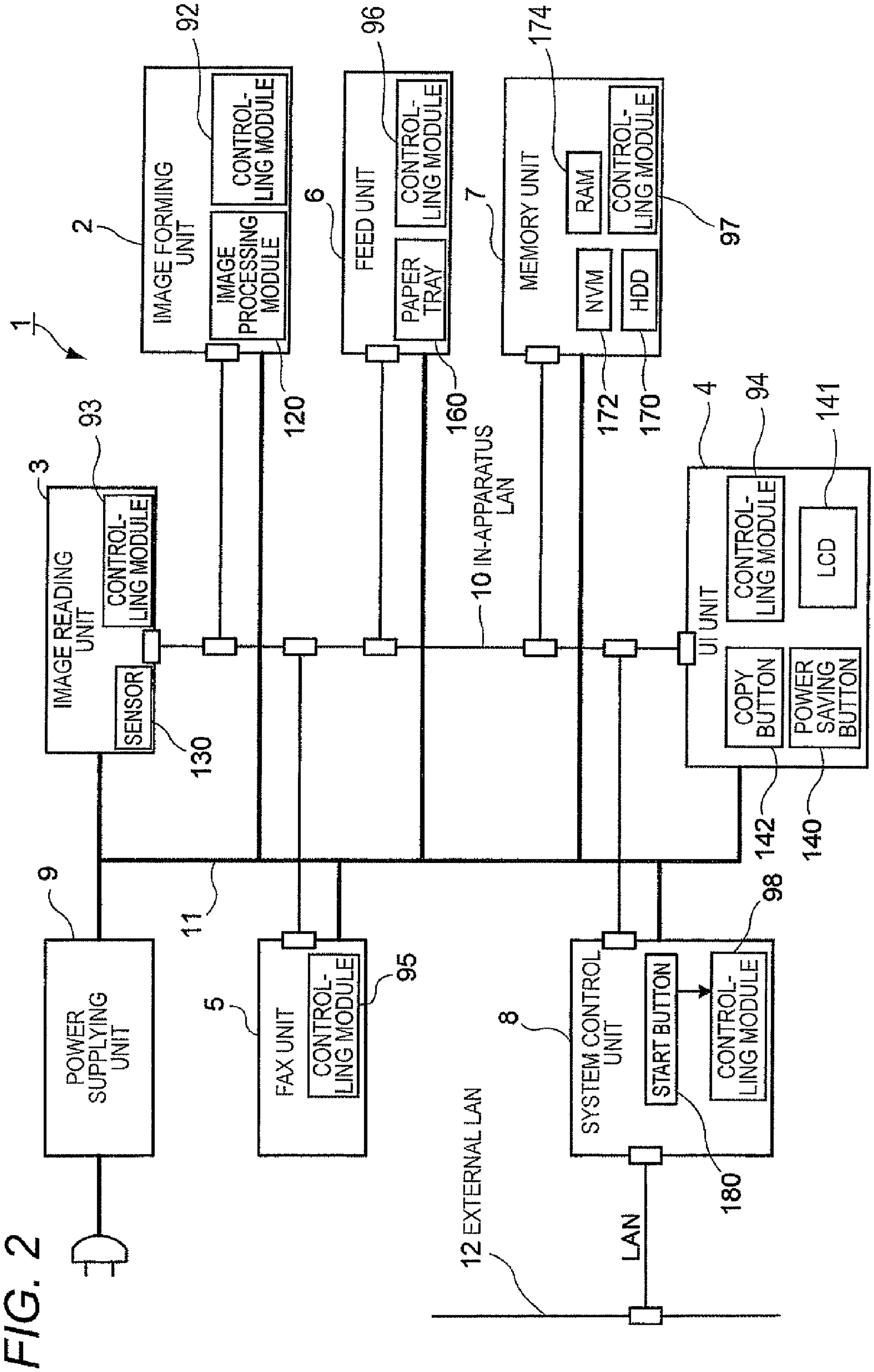
FIG. 2 is a diagram for describing a functional configuration of the image forming apparatus shown in FIG. 1.

FIG. 2 is a diagram that describes a functional configuration of the image forming apparatus 1 shown in FIG. 1. In the present embodiment, the image forming unit 2, the image reading unit 3, the UI unit 4, the FAX unit 5, the feed unit 6, the memory unit 7, and the system control unit 8 are connected to an in-apparatus LAN 10 as an example of an in-apparatus communication module. In the present embodiment, one bus (the in-apparatus LAN 10) is connected between the units constituted by each control functioning module and the image forming functioning module to implement an inter-unit communication. In this regard, the present embodiment is different from the related art in which the inter-unit communication is connected by different control buses.

In the present embodiment, an external apparatus is connected to an external LAN 12 through the system control unit 8. That is, in this case, the system control unit 8 serves as, for example, a reception functioning module that receives an execution command of a job from the outside.

In each unit, a controlling module that determines a power supplying/stopping state or executes the control of the power supplying/stopping is installed as described below. As the controlling module, as shown in FIG. 2, an image forming controlling module 92 is installed in the image forming unit 2 as one example of the controlling module, an image reading controlling module 93 is installed in the image reading unit 3 as one example of the controlling module, a UI controlling module 94 is installed in the UI unit 4 as one example of the controlling module, a FAX controlling module 95 is installed in the FAX unit 5 as one example of the controlling module, a feed controlling module 96 is installed in the feed unit 6 as one example of the controlling module, a memory controlling module 97 is installed in the memory unit 7 as one example of the controlling module, and a system control unit controlling module 98 is installed in the system control unit 8 as one example of the controlling module.

The controlling module may be constituted by a central processing unit (CPU) and an application specific IC (ASIC).

In the image forming unit 2, an image processing module 120 is installed, which performs image processing such as a magnification and a demagnification of the image, a compression and an uncompression of the image, image quality adjustment, or image edition.

In the image reading unit 3, a document detecting sensor 130 is installed as an example of a document preparation detecting module that detects the preparation of the document by the user such as an installing of the document (paper to be copied) in the automatic document feeder (ADF) 32 (see FIG. 1). In the UI unit 4, a power saving button 140 for the user to change a power mode to be described below is installed. The user may explicitly command transition to power saving and return by using the power saving button 140. Also, a copy button 142 is installed in the UI unit 4 and further, other buttons (not shown) such as a scan button and a facsimile send button are installed in the UI unit 4. The buttons of the UI unit 4 may be placed by placing a transparent touch panel in the liquid crystal display (LCD) panel 141 that displays an image.

The document detecting sensor 130 may be configured to detect the document preparation by the user such as an opening and closing of the platen cover 34. In this case, such a detection mechanism becomes an example of the document preparation detecting module.

The feed unit 6 includes a paper tray 160. Size information for specifying the size of a paper received in the paper tray 160 is transmitted through the in-apparatus LAN 10 by the feed controlling module 96. As a result, the image forming unit 2 or the UI unit 4 acquire the size information. The paper tray 160 of the feed unit 6 in this case is an example of a feed module. The image forming unit 2 or the UI unit 4 is an example of an acquiring module and further, the size information is one example of paper information.

The memory unit 7 includes a hard disk drive (HDD) 170 serving as a first storage medium that has a rotation mechanism and stores the image by rotating with the rotation mechanism, a nonvolatile memory (NVM) 172 serving as a second storage medium without the rotation mechanism, and a random access memory (RAM) 174 used as an image work area before transmission to the HDD 170 or before processing in the image processing module 120. The hard disk drive 170 is a storage device that rotationally drives a disk coated with a magnetic material and records or reads data on or from the disk by using a magnetic head. The nonvolatile memory 172 may re-record the data and hold the data after power-OFF, and as the nonvolatile memory 172, for example, a flash memory and an electronically erasable and programmable read only memory (EEPROM) may be used. The nonvolatile memory 172 is a memory to store information (such as a parameter of each unit) which is set by a system and further, stores a frame area size. The parameters are examples of information used to implement a plurality of functions. The nonvolatile memory 172 is an example of an information holding module to hold the information.

A start button 180 is installed in the system control unit 8 as an example of a controlling unit of a body of an apparatus to output a signal for executing an image forming function when being operated by the user. The start button 180 is connected with the system control unit controlling module 98 through a hot line. That is, the start button 180 is a key for directly requiring an execution of the system control with respect to the system control unit controlling module 98, and as a result, may be the same as a hot key.

A power line 11 is connected to the image forming unit 2 and other units (the image reading unit 3, the UI unit 4, the FAX unit 5, the feed unit 6, the memory unit 7, and the system control unit 8) of the image forming apparatus 1, and the power is supplied through the power supplying unit 9 that is also connected to the power line 11. The power supplying unit 9 supplies the power of predetermined voltage (24 V) at all times as a normal power.

In the present embodiment, the image forming unit 2 which is the image forming functioning module, and the image reading unit 3, the UI unit 4, the FAX unit 5, the feed unit 6, the memory unit 7, and the system control unit 8 which are various control functioning modules are units that can individually control the power. The units have, for example, following three power modes to control the power:

(i) a power state when the system sleeps (OFF), (ii) a power state in stand-by (5 V), and (iii) a power state when an operation is being executed (24 V).

In the power control, the image forming functioning module and various control functioning modules themselves judge the state of the system or the appropriate passage of time to transit the power mode. That is, the image forming controlling module 92 of the image forming unit 2, and the controlling modules (the image reading controlling module 93, the UI controlling module 94, the FAX controlling module 95, the feed controlling module 96, the memory controlling module 97, and the system control unit controlling module 98) of various control functioning modules (the image reading unit 3, the UI unit 4, the FAX unit 5, the feed unit 6, the memory unit 7, and the system control unit 8) judge their own power supplying or stopping state of themselves based on the information acquired through the in-apparatus communication module (in-apparatus LAN 10) and control the supplying or stopping of power from the power supplying unit 9 serving as the power supplying module. Therefore, the image forming controlling module 92 and the controlling modules (the image reading controlling module 93, the UI controlling module 94, the FAX controlling module 95, the feed controlling module 96, the memory controlling module 97, and the system control unit controlling module 98) even serve as information acquiring modules that acquire information transmitted through the in-apparatus communication module (the in-apparatus LAN 10).

The control of the power supplying or stopping is performed among the units and, in addition, is executed even among respective devices (components) in the unit constituting each of the units. That is, the respective devices constituting each unit are connected to an in-unit LAN interconnecting the respective devices. The respective devices may be configured to judge their own supplying or stopping state of themselves by using controlling modules installed in the respective devices and perform the control of the power supplying or stopping.

Additionally, states into which the image forming unit 2, the image reading unit 3, and the FAX unit 5 transit according to their own judgments include, for example, three states of a power-OFF state as a third power state, a power-ON state of 5 V as a second power state, and a power-ON state of 24 V as a first power state. States into which the UI unit 4 transits according to its own judgment include, for example, three states of a power-OFF state as a third power state, an OFF-state of a backlight of the liquid crystal display (LCD) panel 141 as a second power state, and a power-ON state of 24 V as a first power state.

Power states into which the system control unit 8 transits include, for example, four states of a power-OFF state as a fourth power state, a CPU OFF-state as a third power state, a power-ON state of 5 V as a second power state, and a power-ON state of 24 V as a first power state. The CPU OFF-state represents the power-OFF state of the CPU in a stand-by state.

The functional configuration and the power state of each unit are just exemplary and are not limited to the contents shown in FIG. 2 and the above description. For example, the image forming apparatus 1 may have a configuration without the FAX unit 5 and may be a print dedicated machine without the image reading unit 3 in addition to the above configuration. The image forming apparatus 1 may include a post-processing unit performing post-processing such as filing or folding of paper after an image is formed, in addition to the units shown in the figure, and the post-processing unit may be a separately power controlled configuration as in other units. The power state (power mode) of each of the units is not limited to each states described above, but may have two set-ups such as the OFF and ON states, or four or more set-ups. The value of 5 V or 24 V in each power state is just exemplary.

Hereinafter, descriptions will be made in detail.

<Description in Each Unit>

In regard to the control of the power supplying or stopping performed in each unit, the image forming unit 2 will be described as a representative example.

Figure 3:
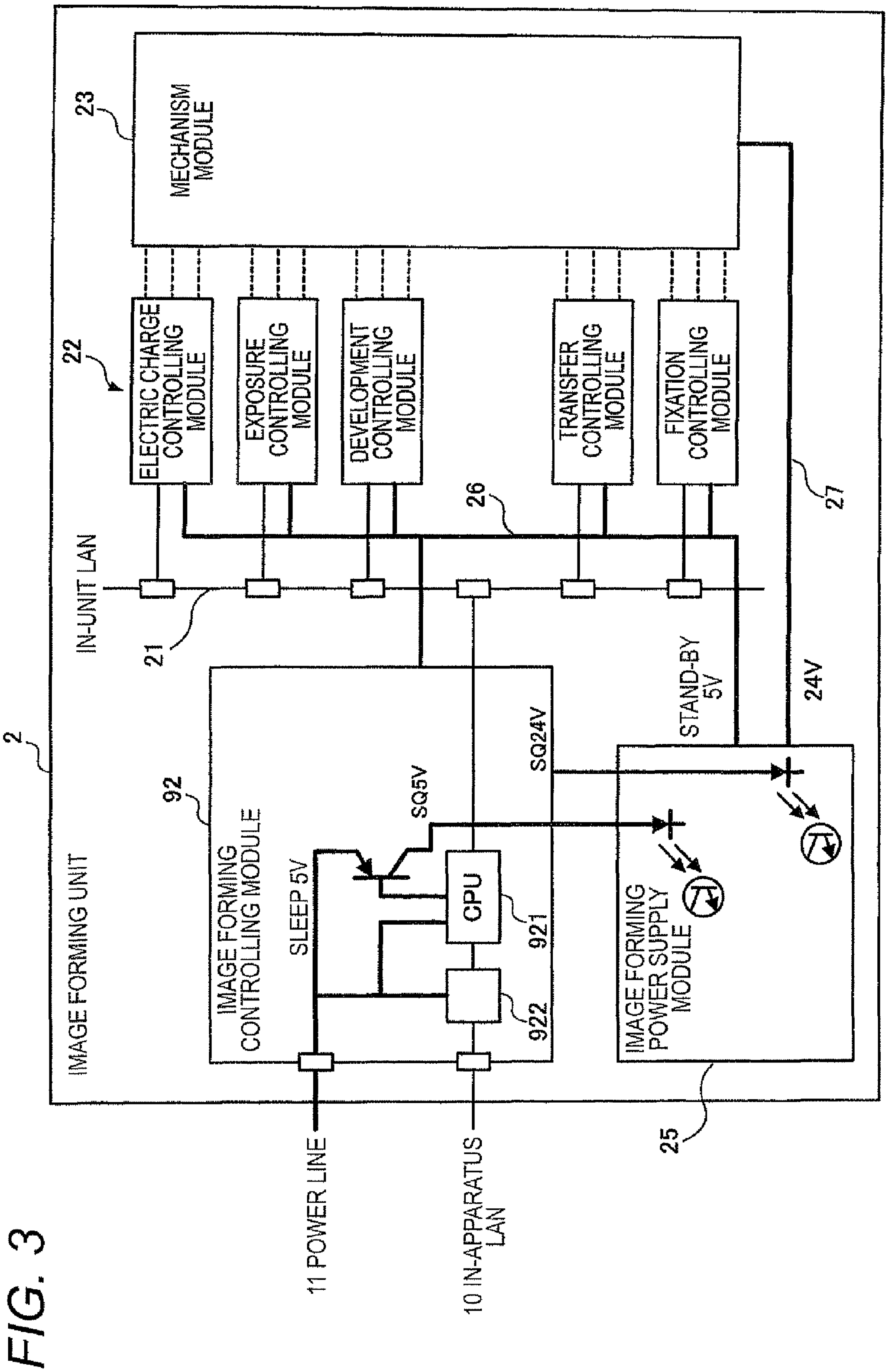
FIG. 3 is a diagram describing a functional configuration of an image forming unit.

FIG. 3 is a diagram describing a functional configuration of the image forming unit 2. The image forming unit 2 which is the image forming functioning module performs an image forming processing based on image data of each color. In the image forming unit 2 shown in FIG. 3, various controlling modules 22 serving as control modules of the respective devices are connected to an in-unit LAN 21. The various controlling modules 22 include an electric charge controlling module, an exposure controlling module, a development controlling module, a transfer controlling module, and a fixation controlling module that control image forming of an electronic photograph type. The various controlling modules 22 control various mechanisms (devices) of a mechanism module 23. More specifically, the various controlling modules 22 control operations of devices such as motor, solenoid, and clutch placed in the mechanism module 23 through mechatronics I/O (IN/OUT). The various controlling modules 22 control process set-up values provided to a device such as an electric charger electrically that charges a photo conductor drum placed in the mechanism module 23 or a laser exposer that exposes the photo conductor drum.

The image forming controlling module 92 is connected to the in-unit LAN 21, and includes a CPU 921 controlling the image forming controlling module 92, and a command filter 922 that is connected to the in-apparatus LAN 10 and filters a command acquired from the in-apparatus LAN 10. For example, when information with a command indicating a content which the image forming unit 2 should process is broadcasted by the in-apparatus LAN 10, the command is selected by the command filter 922. When the power normally provided at all time (for example, 5 V) supplied from the power supplying unit 9 through the power line 11 is configured to be supplied to only the command filter 922 detecting the LAN command, the CPU 921 may be powered OFF during a stand-by state, thereby further saving power.

Each unit such as the image forming unit 2 includes a power supply module. An image forming power supply module 25 is installed in the image forming unit 2 as shown in FIG. 3 and operates under the control of the image forming controlling module 92. In each unit, power is supplied from the power supply module in the unit to each controlling module. A controlling power line 26 supplying stand-by power (5 V) from the image forming power supply module 25 to various controlling modules 22 is installed in the image forming unit 2 as shown in FIG. 3. An operating power line 27 supplying operating power (24 V) from the image forming power supply module 25 to the mechanism module 23 is installed in the image forming unit 2.

<Description of Operation of Power Mode Transition>

The operation of the image forming functioning module and the control functioning module, and an integrated control functioning module will be described.

Herein, as a representative operational example, in regard to an operation of power mode transition when copy processing is performed, states of power mode transition of the image forming unit 2, the image reading unit 3, the FAX unit 5, the UI unit 4, and the system control unit 8 will be described. In each unit, the power mode is transited according to a separate judgment of each unit, and a power saving state is maintained depending on the function of each unit. In an example described below, as the states into which the image forming unit 2, the image reading unit 3, and the FAX unit 5 transit according to their own judgments, three states of the power-OFF state, the power-ON state of 5 V, and the power-ON state of 24 V are displayed. As the states into which the UI unit 4 transits according to its own judgment, three states of the power-OFF state, the OFF-state of the liquid crystal display (LCD) panel 141, and the power-ON state of 24 V are displayed. As the power states into which the system control unit 8 transits, four states of the power-OFF state, the CPU OFF-state, the power-ON state of 5 V, and the power-ON state of 24 V are displayed.

Figure 4:
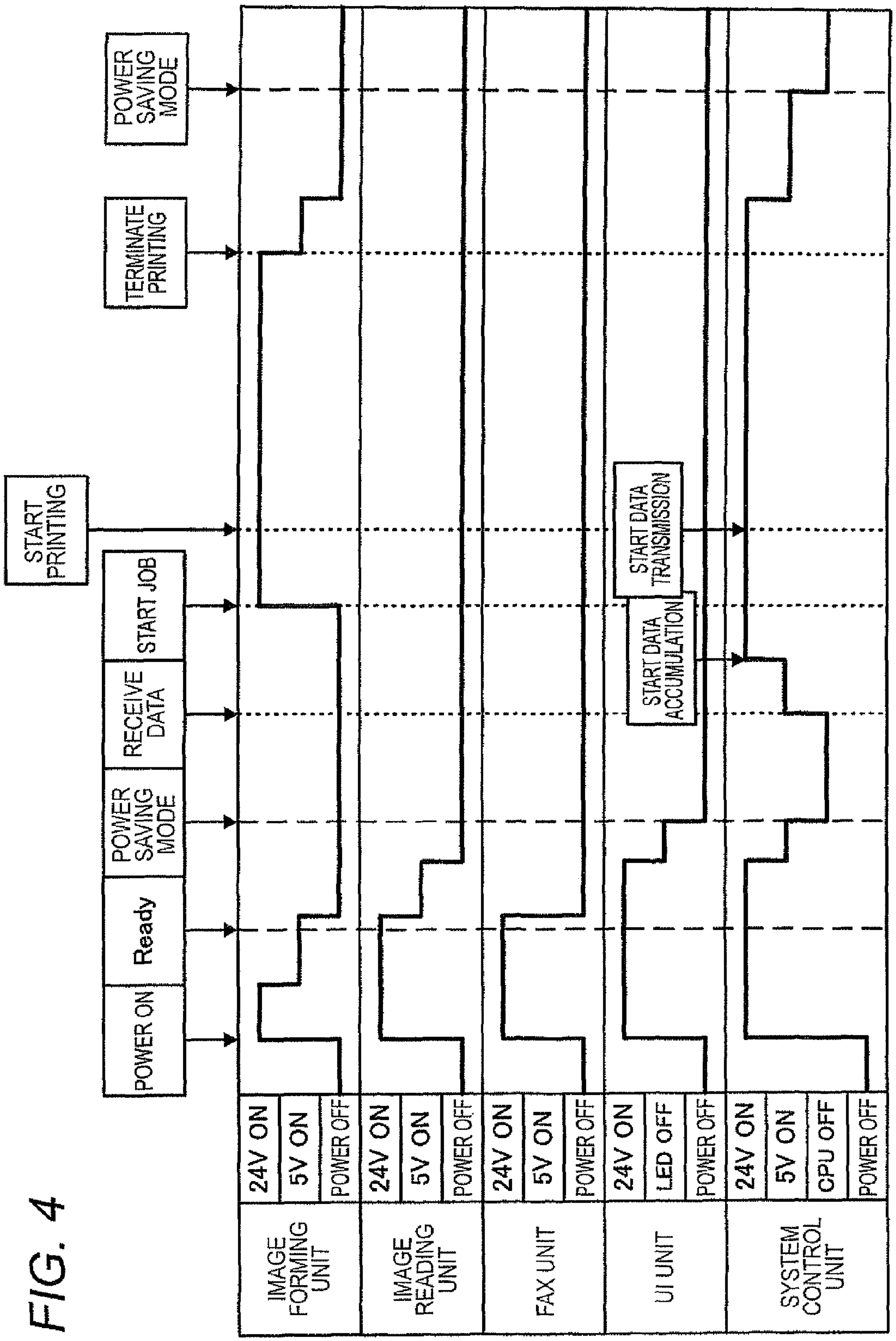
FIG. 4 is a diagram showing a state of power mode transition when a copying processing is performed.

FIG. 4 is a diagram showing states of power mode transition when a copy processing is performed.

'Power-ON' shown in the figure represents, for example, a state in which the main switch of the entire image forming apparatus 1 has become a turned ON state from a turned OFF state, and each unit starts the initialization processing by the power-ON.

The 'Ready' state shown in the figure represents a state in which various image processing operations of a printer, a copier, a facsimile, and a scanner as an entire system can be executed, and a state in which initialization of each unit is terminated. Each unit such as the image forming unit 2, the image reading unit 3, the FAX unit 5, and the UI unit 4 performs initialization processing. After terminating the initialization processing, each unit broadcasts a command through the in-apparatus LAN 10, which indicates that each unit has terminated the initialization processing and is in the ready state. The system control unit 8 recognizes that each unit is in the ready state and provides information indicating that 'the image forming apparatus 1 is in the ready state' to, for example, an external apparatus as necessary. In 'the ready state', units that do not need to be immediately operated at the time when the initialization is completed downs its power level into a low power level according to their own judgments to achieve power saving. Thereafter, the units that do not need to be operated become actively inoperative of themselves to maintain an excellent power saving state.

A 'power saving mode' in the figure as a power saving state which can be recognized by the user represents a state in which the UI unit 4 and the system control unit 8 transit their own power modes to the power saving mode, for example, when image information is not inputted even though a predetermined time elapses after the ready state. Even a light of a panel of the UI unit 4 is turned OFF (the backlight of the liquid crystal display (LCD) panel 141 is in the OFF state), such that the system control unit controlling module 98 of the system control unit 8 is in the OFF state (the CPU OFF state). However, in the system control unit 8, a functioning module (ASIC) monitoring reception of printing job data from the external apparatus through an external LAN 12 or an operating input from the user in the UI unit 4 is in the ON state even in the power saving mode. When the printing job data is received or the operation is inputted from the user, the ASIC transits the power state of the system control unit controlling module 98 from the CPU OFF state to the power-ON state of 5 V.

In the power-OFF state of each unit other than the system control unit 8, each unit may be booted by an external interruption.

Descriptions will be made in more detail by referring to FIGS. 2 and 4.

First, when power is ON from the power supplying unit 9 through the power line 11 and the image forming apparatus 1 is system-booted, a unit requiring the initialization processing performs the initialization processing by the power mode depending on the function of the unit to initialize itself. In this case, for example, when the units need to be synchronized with each other in performing the initialization processing, the system control unit 8 communicates with each unit in order to acquire a required status from each unit. However, each unit of the present embodiment separately performs the initialization processing in general. As a result, when the power is ON, the image forming unit 2, the image reading unit 3, the UI unit 4, the FAX unit 5, and the system control unit 8 transit their own power state from the power-OFF state to the power-ON state of 24 V. Although not shown in FIG. 4, the feed unit 6 and the memory unit 7 operate in the same manner as above. In the power-ON state, each unit executes the initialization processing. More specifically, each unit executes the initialization processing with full power, and performs an operation of completing the initialization processing after a time required for the initialization processing elapses and an operation of transiting to a mode in which the power level is decreased to a level lower than the full power state when a predetermined time elapses after the initialization processing is completed according to each unit's own judgment.

That is, the image forming controlling module 92 of the image forming unit 2 which is in the power-ON state of 24 V is transited to the power-ON state of 5 V during the initialization processing based on its own reference according to its own judgment. In the image forming unit 2, the initialization processing of devices installed in the image forming unit 2 is completed in a relatively short time. As a result, at the time when the initialization processing of the devices is completed during the initialization processing, the power-ON state of 24 V required to operate all the devices of the image forming unit 2 is transited to the power-ON state of 5 V in which the CPU controlling the image forming unit 2 needs to be operated.

The image forming controlling module 92 completes the initialization processing and is transited to the ready state, and thereafter, the image forming controlling module 92 is transited from the power-ON state of 5 V to the power-OFF state based on its own reference according to its own judgment.

The image reading unit 3 terminates the initialization in the power-ON state of 24 V required to operate all the devices because a time is required for various set-up processing operations in the devices installed in the image reading unit 3 during the initialization processing. After the image reading unit 3 completes the initialization processing and is transited to the ready state, the image reading unit 3 is transited to the power-ON state of 5 V based on its own reference according to its own judgment by the image reading controlling module 93 of the image reading unit 3. By setting up the power-ON state of 5 V, for example, when a copying command or an image reading command is given in the mean time, a time required to initialize communication is reduced and an output is more rapidly provided to the user. After the power-ON state of 5 V, the image reading unit 3 is transited to the power-OFF state based on its own reference according to its own judgment by the image reading controlling module 93.

The FAX unit 5 terminates the initialization in the power-ON state of 24 V. The FAX controlling module 95 of the FAX unit 5 completes the initialization processing and is transited to the ready state and, thereafter, is transited from the power-ON state of 24 V to the power-OFF state without particularly setting a period of the power-ON state of 5 V based on its own reference according to its own judgment.

Even after the UI unit 4 completes the initialization processing and is transited to the ready state, the UI unit 4 maintains the power-ON state of 24 V longer according to its own judgment by the UI controlling module 94 than the image reading unit 3 or the FAX unit 5. This is to immediately perform the processing operation by shortening a booting time by considering the case where the user input such as the copying command is performed. Thereafter, after the UI unit 4 is transited to the power-ON state of 5 V, the UI unit 4 is transited to the power-OFF state first based on its own reference according to its own judgment by the UI controlling module 94.

Even after the system control unit 8 also completes the initialization processing and is transited to the ready state, the system control unit 8 maintains the power-ON state of 24 V for a predetermined time according to its own judgment by the system control unit controlling module 98 as in the power-ON state of 24 V of the UI unit 4. As a result, the system control unit 8 maintains a state in which the processing can be immediately started with respect to various commands including the image processing command by the user. Thereafter, after the system control unit 8 is transited to the power-on state of 5 V, the system control unit 8 is transited to the CPU OFF state first based on its own reference according to its own judgment by the system control unit controlling module 98.

After being transited to the power saving mode, when the document is installed in the automatic document feeder (ADF) provided in the image reading unit 3 or the platen cover covering the platen glass is opened or closed (document detection), the image reading unit 3 is transited to the power-ON state of 5 V. The image reading controlling module 93 of the image reading unit 3 broadcasts a command (document detection command) indicating that the installation of the document is detected to each of the other units through the in-apparatus LAN 10.

Each unit that receives the broadcasted document detection command from the in-apparatus LAN 10 sets up the power mode according to its own judgment.

Specifically, when the UI unit 4 receives the document detection command from the image reading unit 3, the UI unit 4 is transited from the power-OFF state to the power-ON state of 24 V. As a result, the UI controlling module 94 and the mechanism modules of the UI unit 4 are powered ON, such that the user presses a copy start button (start button) to prepare for the start of the copying operation.

When the system control unit 8 receives the document detection command from the image reading unit 3, the ASIC installed in the system control unit 8 transits the system control unit controlling module 98 from the CPU OFF state to the power-ON state of 5 V. As a result, the system control unit 8 prepares for the start of the copying operation.

In this regard, the FAX unit 5 does not need to perform an operation corresponding to the document detection command from the image reading unit 3. As a result, the FAX unit 5 maintains the power-OFF state as the power mode.

The image forming unit 2 does not need to perform the operation corresponding to the document detection command at the time of receiving the document detection command from the image reading unit 3. As a result, the image forming unit 2 maintains the power-OFF state as the power mode. Although not shown in FIG. 4, the feed unit 6 operates in the same manner as described above.

Continuously, the UI unit 4 broadcasts a command (button pressing command) for notifying that the start button is pressed to each of the other units through the in-apparatus LAN 10 when the user presses the start button of the UI unit 4.

The system control unit controlling module 98 transits the power mode from the power-ON state of 5 V to the power-ON state of 24 V when the system control unit 8 receives the button pressing command from the UI unit 4. As a result, the mechanism module of the system control unit 8 is powered ON. A command (job starting command) indicating the start of the copying processing (job) is broadcasted to each of the other units through the in-apparatus LAN 10.

The image forming unit 2 transits the power mode from the power-OFF state to the power-ON state of 24 V when the image forming unit 2 receives the job starting command from the system control unit 8. As a result, the mechanism module 23 (see FIG. 3) of the image forming unit 2 is powered ON to start preparation for forming the image (job start) and starts warm-up processing for setting the fixation module included in the mechanism module 23 as a fixable state. The image forming controlling module 92 broadcasts a command (warm-up completion notifying command) for notifying that the warm-up processing is completed to each of the other units through the in-apparatus LAN 10 when the warm-up processing of the fixation module is completed.

The image reading controlling module 93 transits the image reading unit 3 from the power-on state of 5 V to the power-on state of 24 V when the image reading unit 3 receives the job starting command from the system control unit 8. As a result, the mechanism module of the image reading unit 3 is powered ON. The image reading unit 3 waits for the warm-up completion notifying command from the image forming unit 2. The image reading controlling module 93 starts reading of the document when the image reading unit 3 receives the warm-up completion notifying command from the image forming unit 2. The image reading controlling module 93 broadcasts a command (document reading starting command) indicating that the reading of the document starts to each of the other units through the in-apparatus LAN 10.

The system control unit controlling module 98 starts accumulation of the image data transmitted from the image reading unit 3 when the system control unit 8 receives the document reading starting command from the image reading unit 3. After the accumulation starts, when image data of a predetermined data amount is accumulated, the system control unit controlling module 98 transmits the accumulated image data to the image forming unit 2. As a result, the image forming unit 2 starts image forming (printing) based on the image data acquired from the system control unit 8.

Although not shown in FIG. 4, even the feed unit 6 starts an operation of feeding paper through the same process. In this case, the image forming controlling module 92 and the feed controlling module 96 of the feed unit 6 broadcast a command (image forming start notifying command) for notifying that the image forming operation starts to each of the other units through the in-apparatus LAN 10.

Herein, in the image forming unit 2 and the feed unit 6 that start the printing, the controlling modules (various controlling modules 22) installed in the image forming unit 2 or the controlling module installed in the feed unit 6 may be configured to judge the power supplying or stopping state of the controlling module and each device (mechanism module 23) constituting the image forming unit 2 or each device constituting the feed unit 6 of itself and control the power supplying or stopping state of the controlling module and each device of itself.

Referring back to the image reading unit 3, the image reading controlling module 93 transits the power mode of the image reading unit 3 from the power-ON state of 24 V to the power-ON state of 5 V when the image reading unit 3 completes the reading of the document. As a result, the mechanism module of the image reading unit 3 is powered OFF, but the operating state of the image reading controlling module 93 is maintained for a predetermined time. And then, the image reading unit 3 maintains the stand-by state to read the subsequent document. The image reading controlling module 93 broadcasts a command (a reading completion notifying command) for notifying that the reading of the document is completed to each of the other units through the in-apparatus LAN 10.

When the system control unit 8 receives the reading completion notifying command from the image reading unit 3, the system control unit controlling module 98 recognizes the command from the image reading unit 3 and completes the accumulation of the image data from the image reading unit 3. However, thereafter, the system control unit 8 needs to continue transmitting the accumulated image data to the image forming unit 2. The system control unit 8 recognizes that the image forming operation is performed by the image forming unit 2 or the feed unit 6 according to the image forming start notifying command from the image forming unit 2 and the feed unit 6. As a result, the system control unit controlling module 98 maintains the power-ON state of 24 V in order to transmit the accumulated image data or monitor the operation of the entire image forming apparatus 1.

The image forming controlling module 92 transits the power mode of the image forming unit 2 from the power-ON state of 24 V to the power-ON state of 5 V when the image forming unit 2 completes the printing. As a result, the mechanism module 23 of the image forming unit 2 is powered OFF, but the operating state of the image forming controlling module 92 is maintained for a predetermined time. In the meantime, the image forming unit 2 maintains the stand-by state to input various image data including next image data from the image reading unit 3. Also, the image forming controlling module 92 broadcasts a command (an image forming completion notifying command) for notifying that the printing is completed to each of the other units through the in-apparatus LAN 10. When no image data is inputted even after a predetermined time elapses, the image forming controlling module 92 is also powered OFF and the image forming unit 2 is transited to the power-OFF state.

Although not shown in FIG. 4, the feed unit 6 also operates in the same manner as above.

The system control unit controlling module 98 maintains the power-ON state of 24 V for a predetermined time and thereafter, transits the power mode of the system control unit 8 from the power-ON state of 24 V to the power-ON state of 5 V when the system control unit 8 receives the image forming completion notifying command from the image forming unit 2. As a result, the mechanism module of the system control unit 8 is powered OFF, but the operating state of the system control unit controlling module 98 is maintained for a predetermined time. In the meantime, the system control unit 8 maintains the stand-by state to input the command broadcasted from each unit through the in-apparatus LAN 10. When no command is inputted from each unit even after a predetermined time elapses, it is judged that no image information (various image data) is inputted to the image forming apparatus 1, such that the system control unit controlling module 98 is transited to the CPU OFF state to be in a power saving mode.

The UI controlling module 94 maintains the power-on state of 24 V for only a predetermined time and thereafter, transits the power mode of the UI unit 4 from the power-ON state of 24 V to the power-ON state of 5 V, and thereafter, is transited to the power OFF state as in the system control unit controlling module 98 when the UI unit 4 receives the image forming completion notifying command from the image forming unit 2. However, the UI unit 4 maintains the power-ON state of 24 V for a longer time than the system control unit 8 in order to immediately perform the processing operation by shortening a booting time by considering the case where the user input such as the copying command is performed.

As described above, in the case of performing the copy processing as an example, the transition of the power mode by the image forming functioning module and various control functioning modules has been described. As described above, in the present embodiment, according to the type of job (processing) to be executed, each unit having a function required to execute the job separately performs the power control. That is, if the job to be executed is facsimile reception, the units (the system control unit 8, the FAX unit 5, and the image forming unit 2) having a function required for the facsimile reception are powered ON. When the job to be executed is printing processing based on a remote control from the outside, the units (the system control unit 8 and the image forming unit 2) having a function required for the printing processing by the remote control are powered ON. When the function is not used until a predetermined time elapses after the job is executed, the unit is transited to a power-ON state of a lower power and finally, transited to the power-OFF state.

Herein, with respect to the operational state (power state) of each unit of the image forming apparatus 1, a low power consumption state such as the power-OFF state or the power-ON state of a low power in stand-by will be called as a low power state, and a high power consumption state when the job is executed will be called as a high power state. Therefore, as described above, when the function of each unit of the image forming apparatus 1 is not used, each unit is transited to the low power state having lower power consumption, and when the function is used, each unit is separately transited to the high power state. In the low power state, an operation mode when the entire system is in the power-OFF state (the system control unit 8 is in the CPU off state) is the power saving mode. In order for the unit having the required function in the low power state such as the power saving mode to be transited to the high power state in the entire system, an execution command of the job by the remote control needs to be given from the external apparatus (computer) and the user needs to control the power saving button 140 of the UI unit 4. The former includes receiving faxes by the FAX unit 5.

In the image forming apparatus of the present embodiment described above, the image forming controlling module 92 of the image forming unit 2 and the controlling modules (the image reading controlling module 93, the UI controlling module 94, the FAX controlling module 95, the feed controlling module 96, the memory controlling module 97, and the system control unit controlling module 98) of various control functioning modules (the image reading unit 3, the UI unit 4, the FAX unit 5, the feed unit 6, the memory unit 7, and the system control unit 8) perform the power control of self-units of themselves. In this regard, for example, the system control unit 8 may be configured to collectively perform the power control of each unit.

<Configuration Example of Hardware>

Figure 5:
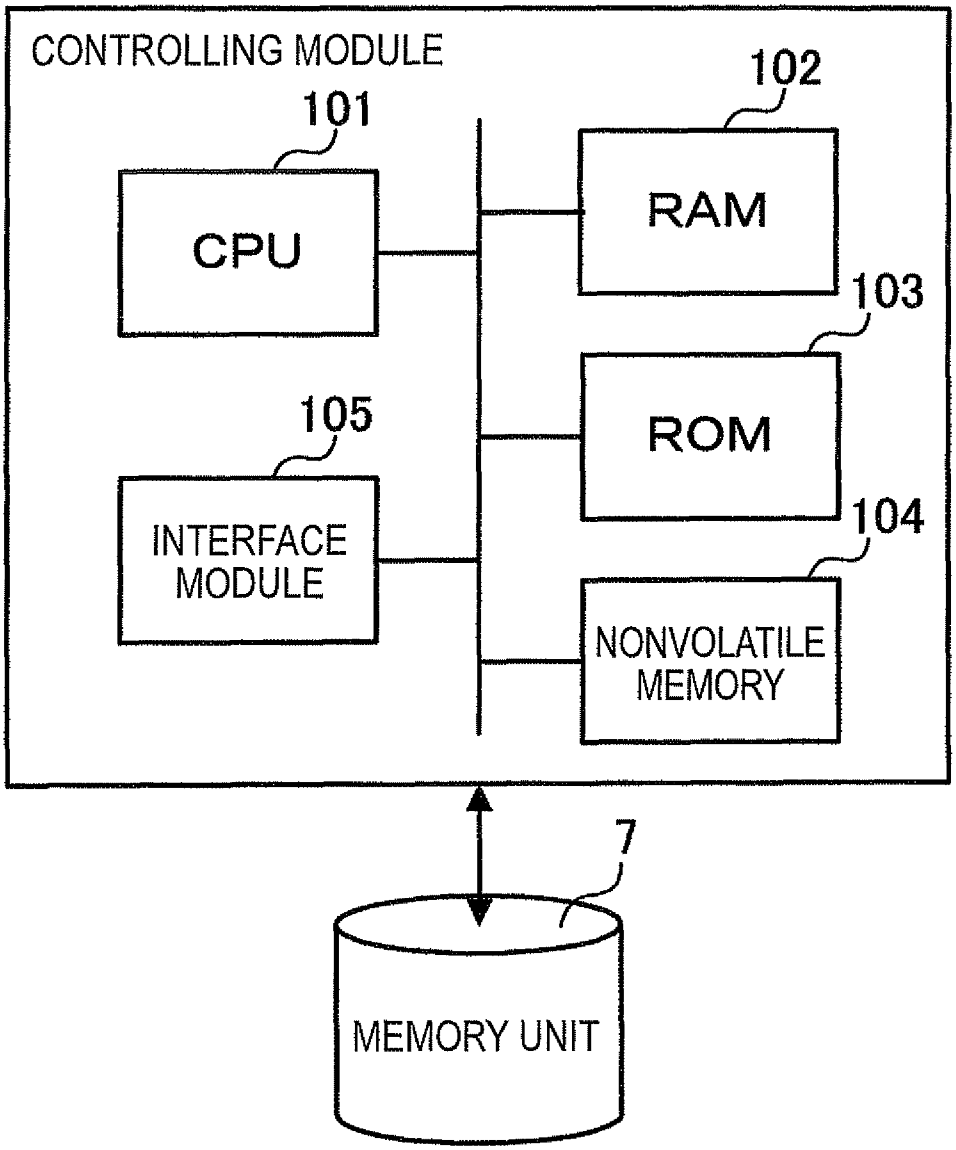
FIG. 5 is a diagram showing a configuration example of hardware of a controlling module of an image forming functioning module or various control functioning modules.

FIG. 5 is a diagram showing a configuration example of hardware of the controlling modules (the image forming controlling module 92, the image reading controlling module 93, the UI controlling module 94, the FAX controlling module 95, the feed controlling module 96, the memory controlling module 97, and the system control unit controlling module 98) of the image forming functioning module or various control functioning modules (the image reading unit 3, the UI unit 4, the FAX unit 5, the feed unit 6, the memory unit 7, and the system control unit 8).

As shown in FIG. 5, the controlling module in the present embodiment includes a CPU 101 as an example of a computing module that executes a digital computing processing according to a predetermined program, a RAM 102 that stores the program executed by the CPU 101, a ROM 103 that stores data including a set-up value used in the program executed by the CPU 101, a nonvolatile memory 104 such as an EEPROM or a flash memory that can re-record data to hold data even when power is not supplied, and an interface module 105 that controls the input or output of a signal in and from each device connected to the controlling module, in controlling the transition of the power mode of the image forming functioning module or various control functioning modules.

The program executed by each controlling module is stored in the memory unit 7 and each controlling module reads the processing program to control the transition of the power mode of the image forming functioning modules or various control functioning modules. That is, a program that controls the transition of the power mode of the image forming functioning module or various control functioning modules is read into the RAM 102 in each controlling module from a hard disk or a DVD-ROM that serves as, for example, the memory unit 7. The CPU 101 performs various processing operations based on the program read in the RAM 102. As other providing patterns of the program, the program is stored in advance in the ROM 103 and the program is loaded to the RAM 102. When the ROM 103 such as the EEPROM which is re-recordable is provided, each controlling module is set and, thereafter, only the program is installed in the ROM 103 and loaded to the RAM 102. The program is transmitted to each controlling module through the external LAN 12 such as the Internet to be installed in the ROM 103 of each controlling module and loaded to the RAM 102.

<Control of Transition to Power Saving Mode>

The control of the transition to the power saving mode will be described according to the present embodiment.

As described with reference to FIG. 4, in the present embodiment, the controlling modules (the image forming controlling module 92, the image reading controlling module 93, the UI controlling module 94, the FAX controlling module 95, the feed controlling module 96, the memory controlling module 97, and the system control unit controlling module 98) of the units constituting the image forming apparatus 1 individually transit the units to the high power state according to the functions required for the jobs to be executed. A unit in which the job is terminated and the function is not used is transited to the low power state, such that the entire image forming apparatus 1 is finally in the power saving mode.

Figure 6:
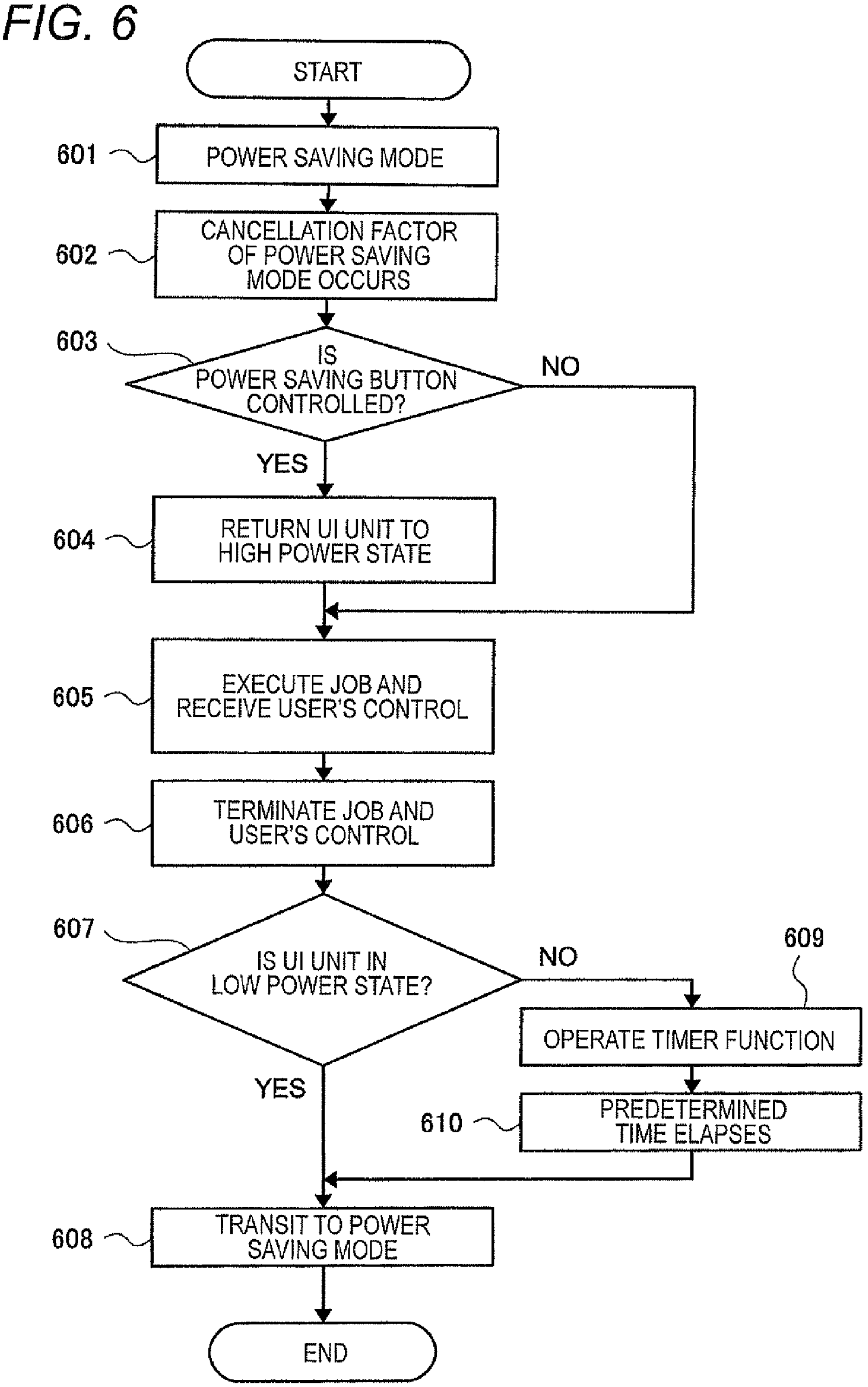
FIG. 6 is a flowchart illustrating the control of a power state after executing a job according to the present embodiment.

FIG. 6 is a flowchart illustrating the control of a power state after executing a job according to the present embodiment.

In FIG. 6, it is assumed that when the entire image forming apparatus 1 is in the power saving mode (step S601), a factor that cancels the power saving mode occurs (step S602). The factor that cancels the power saving mode is, for example, when the execution command of the job by the remote control is given from the external apparatus (computer), or when the user controls the power saving button 140 of the UI unit 4.

When the power saving mode of the image forming apparatus 1 is cancelled as the user controls the power saving button 140 ("Yes" at step S603), the UI unit 4 is returned to the high power state (step S604) and receives the control by the user (step S605). Herein, if the control by the user is associated with the job such as the copy processing, the designated job is executed according to the control. In this case, according to the content of the designated job, the unit having the required function is returned to the high power state. If the control by the user is a control (a change of set-up of the image forming apparatus 1) other than the control associated with the job, the system control unit 8 is in the high power state to execute the designated processing based on the control.

Meanwhile, when the power saving mode of the image forming apparatus 1 is cancelled by the execution command of the job by the remote control ("No" at step S603), the UI unit 4 is not returned to the high power state but the unit which is needed according to the job associated with the execution command executes the job based on the received command (step S605).

When the job executed at step S605 is terminated (step S606), the controlling module of the unit used to execute the job judges whether the UI unit 4 is in the low power state (step S607). Herein, when the cancellation of the power saving mode at step S602 is made by the execution command of the job of the remote control, the transition of the UI unit 4 to the high power state at step S604 is not performed, and as a result, the UI unit 4 is in the low power state ("Yes" at step S607). In this case, the controlling module of each unit immediately transits its own unit to the low power state (step S608). More specifically, each unit that is transited to the low power state goes through the power-ON state of low power (for example, the power-ON state of 5 V shown in FIG. 4) and, thereafter, is transited to the power-OFF state.

Meanwhile, when the cancellation of the power saving mode at step S602 is made by the control of the power saving button 140 by the user, the UI unit 4 is transited to the high power state at step S604, and, as a result, the UI unit 4 is not in the low power state ("No" at step S607). In this case, the controlling module of each unit measures an elapsed time by actuating a timer function (step S609) and when a predetermined time elapses from the termination of the job (step S610), the controlling module of each unit transits its own unit to the low power state (step S608).

If the control by the user performed at step S602 is other than the control associated with the job, the job is not executed at step S605 but the processing based on the control of the system control unit 8 is executed. After the control of the user is terminated at step S606 (that is, when the control is not performed for a predetermined time), the system control unit controlling module 98 judges whether the UI unit 4 is in the low power state (step S607). In this case, because the power saving button 140 is controlled by the user, the UI unit 4 is at all times in the high power state ("No" at step S607). Therefore, the system control unit 8 is transited to the low power state after a predetermined time elapses (steps S609, 610, and 608).

In the above operation example, at step S603, when the power saving mode of the image forming apparatus 1 is cancelled by the execution command of the job of the remote control, the job is executed while the UI unit 4 is not returned to the high power state. However, as described with reference to FIG. 4, the UI unit 4 maintains the power-ON state of 24 V for a longer time than the other units. Therefore, when the UI unit 4 is in the power-ON state of 24 V, the image forming apparatus 1 may receive the execution command of the job by the remote control. In this case, at step S607, since the UN unit 4 is not in the low power state, the system control unit 8 is transited to the low power state after a predetermined elapses (steps S609, 610, and 608).

In the above operation example, when the UI unit 4 is in the low power state at step S607, the controlling module of each unit immediately transits its own unit to the low power state. In this regard, even when the UI unit 4 is in the low power state, time counting is performed by the timer function and after a predetermined time elapses, the unit may be transited to the low power state. In this case, for example, a time (hereinafter, referred to as a second set time) until the unit is transited to the low power state when the UI unit 4 is in the low power state ("Yes" at step S607) is set to be shorter than a time (hereinafter, referred to as a first set time) until the unit is transited to the low power state when the UI unit 4 is not in the low power state ("No" at step S607).

Herein, the case in which the UI unit 4 is in the low power state ("Yes" at step S607) is compared with the case where the UI unit 4 is in the high power state ("No" at step S607) when the job is being executed. In both cases, the execution command of the job by the remote control may be made, but in the case where the UI unit is in the low power state when the job is being executed, at least the control of the power saving button 140 is not performed within the set time when the UI unit 4 is transited from the high power state to the low power state before the job is executed. Meanwhile, in the case where the UI unit is in the high power state when the job is being executed, the power saving button 140 is surely controlled for a shorter time than the set time when the UI unit 4 is transited from the high power state to the low power state before the job is executed.

Therefore, in the case where the UI unit 4 is in the high power state when the job is being executed, it is estimated that the possibility that subsequent jobs will be executed at predetermined short time intervals is high. In the case in which the UI unit 4 is in the low power state, the job is executed once and thereafter, it is estimated that the possibility that subsequent jobs will be immediately executed is low. Based on the estimations, in the present embodiment, the second set time is set to be shorter than the first set time.

In the present embodiment, the user may set the first set time and the second set time. In this case, the UI unit 4 displays an interface screen for setting up the set time on the liquid crystal display (LCD) panel 141. The user performs a set-up control of each set time according to the displayed interface screen. The system control unit 8 receives the set-up and uses the set-up as the set time (the first set time and the second set time) for transiting each unit to the low power state after the job is executed. Both of the first set time and the second set time are configured not to be set up but only any one may be configured to be set up. When both sides are configured to be set up, an input control may be performed in order to prevent the second set time from being longer than the first set time.

In the above operation example, by using only the power state (the high power state or the low power state) of the UI unit 4 as a condition when the job is executed, the time (hereinafter, referred to as a transition time) when the unit for executing the job which is in the high power state is transited to the low power state is switched. In this regard, the transition time may be switched by using the power state of the image forming unit 2, which is an output device, as another condition, in addition to the power state of the UI unit 4. The image forming unit 2 performs fixation processing of heating and pressurizing in order to fix an image formed on paper by the fixation module included in the mechanism module 23 when a toner is used as an image forming material. Power consumption required for the fixation processing occupies a particularly large ratio in total power consumption of the image forming apparatus 1.

Specifically, for example, at step S607 of FIG. 6, it is judged whether the UI unit 4 is in the low power state and whether the image forming unit 2 is in the high power state. When the UI unit 4 is in the low power state and the image forming unit 2 is in the high power state, each unit which is in the high power state is transited to the low power state immediately after the job is executed (alternatively, after the second set time elapses). Meanwhile, in other cases, each unit which is in the high power state is transited to the low power state after the first set time elapses.

The above operation is compared with the case (the case shown in FIG. 6) where only the power state of the UI unit 4 is used as the switching condition of the transition time. Therefore, when the image forming unit 2 is in the low power state (the case where units other than the image forming unit 2 are used to execute the job) even though the UI unit 4 is in the low power state, it is different from the above case in that each unit which is in the high power state is transited to the low power state after the first set time elapses. That is, when the image forming unit 2 requiring significant power consumption is in the low power state, the transition time in the other units is longer than the case where only the power state of the UI unit 4 is used as the switching condition of the transition time.

Herein, in the image forming apparatus 1, if each unit is in the low power state, power saving effect is large and if each unit is in the high power state, the user convenience is high. The reason therefor is that a stand-by time until the job is executed after the execution command of the job is received is short if each unit is in the high power state. Accordingly, as described above, by adding the power state of the image forming unit 2 to the switching condition of the transition time, the user convenience can be improved while the power saving effect does not largely deteriorate.

Contrary to the above example, when predetermined processing is performed, when the UI unit 4 is in the low power state and the image forming unit 2 is in the high power state, the control for transiting each unit which is in the high power state to the low power state after the first set time elapses, may be performed. For example, a special job is considered where the job accompanied by the printing is executed by the remote control and only an operation of forming and discharging the image on the paper which is the final step of the job is executed by standing-by the control of the UI unit 4 by the user. In this case, when the user arrives at an installation place of the image forming apparatus 1 in order to control the UI unit 4, the operation of immediately discharging the paper can be executed if the image forming unit 2 is in the high power state, such that the user convenience is high.

As described above, in the present embodiment, descriptions have been made regarding the control for switching of the length of the transition time when each unit is transited from the high power state to the low power state by using, for example, the power state of the UI unit 4 as the switching condition. That is, according to the present embodiment, complicated conditions do not need to be judged and control content is simplified because the control is performed depending on the power state (operational mode) of the UI unit 4, rather than the function in each unit.

In the present embodiment, the control for switching the length of the transition time when the each unit is transited from the high power state to the low power state has been described. Herein, there are cases where three steps or more states are set up as the power state of each unit. In this case, the switching control of the transition time according to the present embodiment may be applied to all cases where the unit in the higher power state is transited to the lower power state. For example, the power-ON state of low power (5 V) and the power-OFF state are set up as the low power state in the present embodiment as well. In this case, even in the transition time when each unit is transited from the power-ON state of low power to the power-OFF state, the switching control may be performed in the same method as the embodiment.

Although, the target job where the switching control of the transition time to the low power state is performed after the job is executed is not specified, the switching control of the transition time according to the present embodiment may be set to be performed only when a specific type of job is executed. According to the job type, the determination may be set up whether the switching control of the transition time is separately performed. Alternatively, the user (a user who performs the execution command of the job) of the image forming apparatus 1 is identified and the determination may be set up whether the switching control of the transition time is separately performed for each user. Moreover, the determination whether the switching control of the transition time according to the embodiment is performed may be separately set up with respect to the individual units constituting the image forming apparatus 1.

Additionally, another embodiment is below. At step S607 in FIG. 6, either of the first and second set times may be set under conditions of the power state of the UI unit 4 and the termination of the job execution. Specifically, in a case that (i) the UI unit 4 is in the low power state and (ii) the execution of the job is terminated, the first set time is set the operation state of each unit which is in the high power state is transited to the low power sate after the first set time elapses. Further, in a case that (iii) the UI unit 4 is in the high power state and (ii) the execution of the job is terminated, the second set time is set and the operation state of each unit which is in the high power state is transited to the low power state after the second set time elapses.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a plurality of functioning units each including:
an image forming functioning unit that is configured to form an image in a medium; and
a reception functioning unit that is configured to receive an execution command of a processing from outside,
wherein each of the plurality of functioning units is configured to have a high power state having high power consumption and a low power state having low power consumption as an operational state;
a control receiving unit that is configured to receive a user's control and that has a high power state and a low power state as an operational state; and
a controlling unit that is configured to separately control at least the operational state of the control receiving unit and the operational state of a first functioning unit of the plurality of functioning units by transiting between the high power state and the low power state,
wherein, in a case that the control receiving unit is in the high power state, the controlling unit transits the operational state of the first functioning unit which is in the high power state to the low power state when a first set time elapses after an execution of a processing is terminated with respect to at least a predetermined type of the processing, and
in a case that the control receiving unit is in the low power state, the controlling unit transits the operational state of the first functioning unit which is in the high power state to the low power state when a second set time elapses after the execution of the predetermined type of the processing is terminated, the second set time being shorter than the first set time.

2. The image processing apparatus according to claim 1,
wherein the controlling unit sets at least one of the first set time and the second set time based on at least one of a control of the control receiving unit and a command received by the reception functioning unit.

3. An image processing apparatus comprising:
a plurality of functioning units each including:
an image forming functioning unit that is configured to form an image in a medium; and
a reception functioning unit that is configured to receive an execution command of a processing from outside,
wherein each of the plurality of functioning units is configured to have a high power state having high power consumption and a low power state having low power consumption as an operational state;
a control receiving unit that is configured to receive a user's control and that has a high power state and a low power state as an operational state; and
a controlling unit that is configured to separately control at least the operational state of the control receiving unit and the operational state of a first functioning unit of the plurality of functioning units by transiting between the high power state and the low power state,
wherein, in a case that (i) the control receiving unit is in the low power state and (ii) an execution of a processing is terminated, the controlling unit sets a first set time and transits the operation state of the first functioning unit which is in the high power state to the low power state after the first set time elapses, and
in a case that (iii) the control receiving unit is in the high power state and (ii) the execution of the processing is terminated, the controlling unit sets a second set time and transits the operation state of the first functioning unit which is in the high power state to the low power state after the second set time elapses, the second set time being shorter than the first set time.

4. The image processing apparatus according to claim 1,
wherein the controlling unit separately controls the operational states of the plurality of functioning units by transiting between the high power state and the low power state.

5. The image processing apparatus according to claim 1,
wherein the controlling unit controls to transit the operational states of each of the plurality of functioning units which are in the high power state to the low power state based on the first set time and the second set time which are separately set for each processing type.

6. The image processing apparatus according to claim 1,
wherein, in a case that the control receiving unit is in the low power state and the image forming functioning unit is in the high power state with respect to the predetermined type of the processing, the controlling unit controls to transit the operational state of the first functioning unit which is in the high power state to the low power state when the first set time elapses after the predetermined type of the processing is terminated.

7. The image processing apparatus according to claim 6,
wherein the predetermined type of the processing includes a processing which is received by the reception functioning unit and which is instructed by the execution command from outside, and
the predetermined type of the processing is executed so as to perform only (a) forming the image on the medium and (b) discharging the medium on which the image is formed after the control receiving unit receives the user's control.

8. An image processing apparatus comprising:
a plurality of functioning units each including:
an image forming functioning unit that is configured to form an image in a medium; and
a reception functioning unit that is configured to receive an execution command of a processing from outside,
wherein each of the plurality of functioning units is configured to have a high power state having high power consumption and a low power state having low power consumption as an operational state;
a control receiving unit that is configured to receive a user's control and that has a high power state and a low power state as an operational state; and
a controlling unit that is configured to separately control at least the operational state of the control receiving unit and the operational state of a first functioning unit of the plurality of functioning units by transiting between the high power state and the low power state,
wherein, in a case that the control receiving unit is in the high power state or the image forming functioning unit is in the low power state, the controlling unit transits the operational state of the first functioning unit which is in the high power state to the low power state when a first set time elapses after an execution of a processing is terminated with respect to at least a predetermined type of the processing, and in a case that the control receiving unit is in the low power state and the image forming functioning unit is in the high power state, the controlling unit transits the operational state of the first functioning unit which is in the high power state to the low power state when a second set time elapses after the execution of the predetermined type of the processing is terminated, the second set time being shorter than the first set time.

9. A non-transitory computer-readable medium storing a program that causes a computer to execute image processing, the computer controlling an image processing apparatus which includes a plurality of functioning units each including: an image forming functioning unit that is configured to form an image in a medium; a reception functioning unit that is configured to receive an execution command of a processing from outside; a control receiving unit that is configured to receive a user's control; and a high power state having high power consumption and a low power state having low power consumption as an operational state, the image processing comprising:

transiting the operational state of the first functioning unit which is in the high power state to the low power state when a first set time elapses after an execution of a processing is terminated with respect to at least a predetermined type of the processing in a case that the control receiving unit is in the high power state, and transiting the operational state of the first functioning unit which is in the high power state to the low power state when a second set time elapses after the execution of the predetermined type of the processing is terminated in a case that the control receiving unit is in the low power state, the second set time being shorter than the first set time.

10. The image processing apparatus according to claim 1, wherein the first set and second set times are a predetermined times, and wherein the second set time is a predetermined time that is different from the first set time so that the time of changing the operational state of the first functioning unit from a high power state to a low power state depends on the operational state of the control receiving unit.

* * * * *